(12) United States Patent
Azam et al.

(10) Patent No.: US 12,511,089 B2
(45) Date of Patent: Dec. 30, 2025

(54) COLOR GAMUT MAPPING

(71) Applicant: Hewlett-Packard Development Company, L.P., Spring, TX (US)

(72) Inventors: Syed S. Azam, Spring, TX (US); Gregory Staten, Spring, TX (US); Thong Thai, Spring, TX (US); Mario E. Campos, Spring, TX (US); Super Liao, Taipei (TW); Hsing-Hung Hsieh, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 116 days.

(21) Appl. No.: 18/570,625

(22) PCT Filed: Jun. 29, 2021

(86) PCT No.: PCT/US2021/039544
§ 371 (c)(1),
(2) Date: Dec. 14, 2023

(87) PCT Pub. No.: WO2023/277878
PCT Pub. Date: Jan. 5, 2023

(65) Prior Publication Data
US 2024/0394002 A1    Nov. 28, 2024

(51) Int. Cl.
*G06F 3/14* (2006.01)
*G06T 11/00* (2006.01)

(52) U.S. Cl.
CPC .......... *G06F 3/1431* (2013.01); *G06T 11/001* (2013.01)

(58) Field of Classification Search
CPC ....... G06T 11/001; G06F 3/1431; G09G 5/02; G09G 2320/0666; H04N 1/6058; H04N 1/6061
See application file for complete search history.

(56) References Cited

U.S. PATENT DOCUMENTS

| | | |
|---|---|---|
| 6,978,043 B1 | 12/2005 | Haikin et al. |
| 7,830,546 B2 | 11/2010 | Holub |
| 9,001,140 B2 | 4/2015 | Mizukura et al. |

(Continued)

FOREIGN PATENT DOCUMENTS

| | | |
|---|---|---|
| RU | 2630167 C1 | 9/2017 |
| WO | 2018/190786 A1 | 10/2018 |

*Primary Examiner* — Antonio A Caschera
(74) *Attorney, Agent, or Firm* — Quarles & Brady LLP

(57) ABSTRACT

In some examples, a computing device can include a memory resource storing instructions to cause a processor resource to receive, from a first virtual machine assigned a first color gamut, display characteristics of a first display, display characteristics of a second display, or both. In some examples, the instructions can cause the processor resource to receive, from a second virtual machine assigned a second color gamut, the display characteristics of the first display, the display characteristics of the second display, or both, and determine, based on the first color gamut, the second color gamut, and the display characteristics, a color gamut mapping for the first color gamut and the second color gamut. In some examples, the instructions can cause the processor resource to map the first color gamut to the first display and map the second color gamut to the second display based on the color gamut mapping.

13 Claims, 4 Drawing Sheets

(56) References Cited

U.S. PATENT DOCUMENTS

2003/0234793 A1  12/2003 Stokes et al.
2010/0128050 A1   5/2010 Chou et al.
2010/0289812 A1  11/2010 Kobayashi et al.
2019/0266977 A1   8/2019 Ward et al.
2021/0082158 A1* 3/2021 Norris ............... H04N 1/6058

* cited by examiner

COLOR GAMUT MAPPING

BACKGROUND

A color gamut is a subset of colors that can be accurately represented in a given circumstance, for instance within a given color space or by a certain output device. Put another way, a color gamut is a range of colors that a particular device can produce or record. Example color gamuts include standard red green blue (sRGB) color gamut, DCI-P3 color gamut (P3), standard high definition color gamut (709), and 2020, among others.

DETAILED DESCRIPTION

A display is an electronic device for the visual presentation of data. Displays such as monitors, smart device screens, televisions, etc. have color gamut specifications that allow for accurate representation of colors within that color gamut. Displaying an image that is outside the color gamut of the display may not be an accurate representation of the image. Operating systems may not have an ability to manage color gamut per application, resulting in incorrect representation of the colors of the image (e.g., oversaturation, etc.). In such instances, a user may attempt to manually adjust the display, if the option is available, but the adjustment may still result in an inaccurate representation. An operating system can include a collection of executable instructions that manage hardware, software, and provides services for a device.

Examples of the present disclosure include virtual machines assigned a color gamut (e.g., at during or post-creation) whose color gamut can be mapped to a display or displays of a computing device. For instance, a host computing device (e.g., local host computing device, cloud computing service, edge computing device, etc.) can execute a plurality of virtual machines each having a color gamut assigned to the virtual machine. Examples can include determining display characteristics of displays communicatively coupled to the host computing device (e.g., via a virtual machine) and displaying images associated with a virtual machine having a compatible color gamut.

As used herein, the term computing device refers to an electronic system having a processor resource and a memory resource. Examples of computing devices can include, for instance, a laptop computer, a notebook computer, a desktop computer, an all-in-one (AIO) computer, networking device (e.g., router, switch, etc.), and/or a mobile device (e.g., a smart phone, tablet, personal digital assistant, smart glasses, a wrist-worn device such as a smart watch, etc.), among other types of computing devices. As used herein, "communicatively coupled" can include coupled via various wired and/or wireless connections between devices such that data can be transferred in various directions between the devices. The coupling need not be a direct connection, and in some examples can be an indirect connection.

Figure 1:
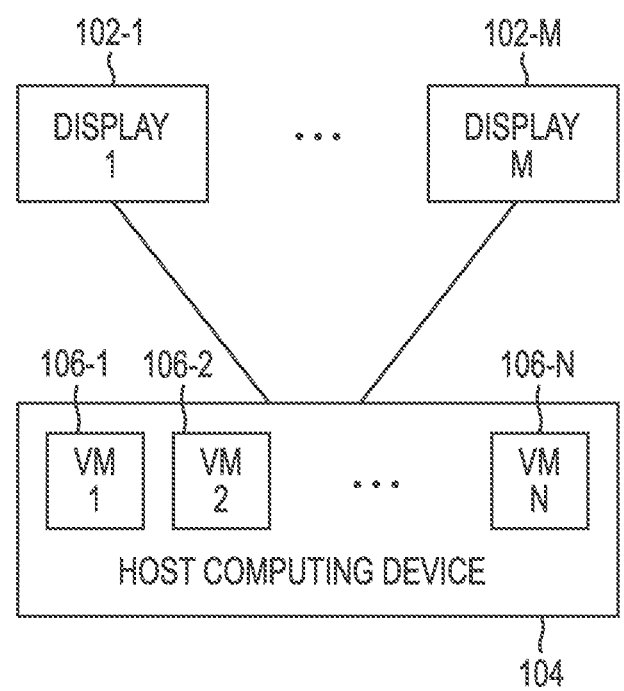
FIG. 1 illustrates a block diagram of an example system for color gamut mapping.

FIG. 1 illustrates a block diagram of an example system for color gamut mapping. The system includes a host computing device 104 executing a plurality of virtual machines 106-1, 106-2, . . . , 106-N. The host computing device 104 can be a local host computing device, a cloud computing service, or an edge computing device, among others. The host computing device 104 can be communicatively coupled to a plurality of displays 102-1, . . . , 102-M. For instance, the host computing device 104 may be communicatively coupled to the displays 102 via the virtual machines 106, a local computing device coupled to the displays 102, or both. More or fewer displays 102 and virtual machines 106 may be present in the system.

Each virtual machine 106 can have an assigned color gamut. Some virtual machines 106 may have the same color gamut, and some may have different color gamuts. For instance, if a user is an animation artist working on a film in a first color gamut, VM1 106-1 may be assigned that first color gamut, and work for that film is performed using VM1 106-1. This can allow for consistency between artists working on the film. For instance, anyone working on the film can use a virtual machine that has been assigned the first color gamut. The user may be prohibited from changing the color gamut assigned to a virtual machine 106 to facilitate consistency in the film's work. This can prevent users from working outside the film's determined color gamut, saving time and money lost to recreating portions of the film created in an incorrect color gamut. In some instances, the color gamut assignment of a virtual machine 106 may be dynamically modified (e.g., changes in response to particular stimuli) to support different application configurations and/or the color gamut assignment may be part of a virtual machine configuration request.

In some examples, VM2 106-2 may be assigned a different color gamut, for instance for a different project on which the user is working. By using VM2 106-2 each time the user works on the different project, consistency in color gamut on the different project can be maintained.

The displays 102 can have different display characteristics, in some examples. The displays 102 may be standard displays or wide gamut displays, among others. Some of the displays 102 can have the same display characteristics, while others may have different display characteristics. The display characteristics, for instance, can include a color gamut specification of the display 102 and/or an electro-optical transfer function (EOTF) associated with the display 102. For instance, the display1 102-1 may be a wide gamut display with a particular EOTF that converts a given input into a linear light output of the display1 102-1. DisplayN 102-N may have the same or different color gamut specifications and/or EOTF.

The virtual machines 106 can pass display characteristic as display profile information (e.g., monitor ICC profiles) for use by applications that support the display and pass it to a processor resource, memory resource, or both, of the host computing device 104. In some examples, the processor resource, memory resource, or both can be located on a local computing device different than the host computing device 104 and communicatively coupled to the displays 102. The processor resource, memory resource, or both, (e.g., whether on the host computing device 104 or a local computing device) can use the display characteristics from each virtual machine 106 and map the color gamut assigned to each virtual machine 106 to the compatible display 102. For examples, a plurality of displays 102, which may have different display characteristics, can be supported by the host computing device 104. Using the display characteristics and the color gamuts assigned to the virtual machines 106, a determination can be made which display 102 on which each virtual machine 106 is displayed (e.g., an image associated with the virtual machine 106). Put another way, the color gamut assigned to the virtual machine 106 can be mapped to the determined display 102.

For instance, if VM1 106-1 is assigned a 2020 color gamut, it can be mapped to a wide gamut display, if available. If a wide gamut display is not available, the associated image can be limited and/or clipped and displayed on a narrow-gamut and/or standard-gamut display that is available. This can allow for a user to see an accurate display of color, regardless of the display characteristics of the display 102. For instance, sRGB images may show correctly in an sRGB virtual machine 106, regardless of whether the paired display 102 is sRGB or wide gamut such as P3.

Figure 2:
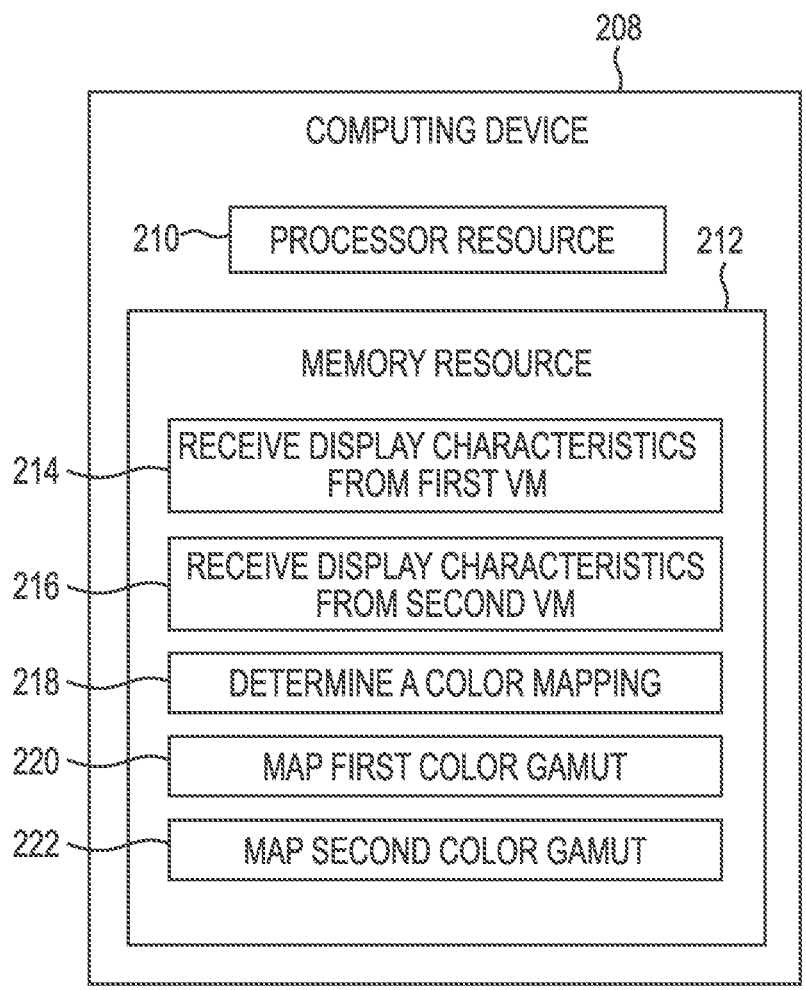
FIG. 2 illustrates an example of a computing device for color gamut mapping.

FIG. 2 illustrates an example of a computing device 208 for color gamut mapping. In the example of FIG. 2, the computing device 208 includes a processor resource 210 and a memory resource (e.g., a non-transitory machine-readable storage medium) 212. The computing device 208 may be analogous to the computing devices 108, 308 described with respect to FIGS. 1 and 3, respectively. In some examples, the computing device 208 is not the host computing device but is a local computing device communicatively coupled to a display.

Although the following descriptions refer to a single processor resource and a single machine-readable storage medium, the descriptions are applicable to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor resource 210 may be a central processing unit (CPU), microprocessor, and/or other hardware device suitable for retrieval and execution of instructions stored in machine-readable storage medium 212. In the particular example shown in FIG. 2, processor resource 212 may receive, determine, and send instructions 214, 216, 218, 220, and 222. As an alternative or in addition to retrieving and executing instructions, processor resource 210 may include an electronic circuit comprising a number of electronic components for performing the operations of the instructions in machine-readable storage medium 212. With respect to the executable instruction representations or boxes described and shown herein, it should be understood that part or all of the executable instructions and/or electronic circuits included within one box may be included in a different box shown in the figures or in a different box not shown.

Machine-readable storage medium 212 may be any electronic, magnetic, optical, or other physical storage device that stores executable instructions. The executable instructions may be "installed" on the computing device 208 illustrated in FIG. 2. Machine-readable storage medium 212 may be a portable, external or remote storage medium, for example, that allows the computing device 208 to download the instructions from the portable/external/remote storage medium. In this situation, the executable instructions may be part of an "installation package".

Instructions 214, when executed by a processor such as the processor resource 210, may cause the computing device 208 (hereinafter referred to as the "host computing device") to receive, from a first virtual machine assigned a first color gamut and executing on the host computing device 208, display characteristics of a first display communicatively coupled to the host computing device 208, display characteristics of a second display communicatively coupled to the host computing device 208, or both. Instructions 216, when executed by a processor such as the processor resource 210, may cause the host computing device 208 to receive, from a second virtual machine assigned a second color gamut and executing on the host computing device 208, the display characteristics of the first display, the display characteristics of the second display, or both. For instance, the first display, the second display, or both, can pass their respective display characteristics as display profile information to the host computing device 208 via the first and/or the second virtual machines.

The display characteristics, for example, can include a color gamut specification of the display (e.g., wide gamut, narrow gamut, standard gamut, 2020, sRGB, P3, etc.) and/or an electro-optical transfer function (EOTF) associated with the display. While two displays are described here, more or fewer displays may be communicatively coupled to the host computing device 208. For instance, when a single physical display is present, the first display can be a first portion of a single display, and the second display can be a second portion of the single display.

Instructions 218, when executed by a processor such as the processor resource 210, may cause the computing device 208 to determine, based on the first color gamut, the second color gamut, the display characteristics of the first display, and the display characteristics of the second display, a color gamut mapping for the first color gamut and the second color gamut. For instance, if the first color gamut assigned to the first virtual machine is P3, the second color gamut assigned to the second virtual machine is sRGB, the display characteristics of the first display indicate it is a wide gamut display, and the display characteristics of the second display indicate it is a narrow gamut display, the color mapping may indicate mapping the first color gamut to the first display and the second color gamut to the second display.

Instructions 220 and 222, when executed by a processor such as the processor resource 210, may cause the computing device 208 to map the first color gamut to the first display based on the color gamut mapping and map the second color gamut to the second display based on the color gamut mapping, respectively. Such color mapping can allow for accurate display of the colors on the first and the second displays. As a user works on an image or other matter associated with the first and/or the second virtual machines, color gamut can remain consistent because each virtual machine is assigned a particular color gamut, and the display associated with each virtual machine can display accurate colorings because of the color mapping.

In some examples, more or fewer virtual machines and/or displays may be present, which can affect the color mapping. For instance, if a single display is available, the first color gamut can be mapped to a first portion of the single display, and the second color gamut can be mapped to a second portion of the single display. In addition, different display characteristics and color gamuts can affect the color mapping. For instance, if the first virtual machine is assigned a P3 color gamut, the second virtual machine is assigned a 2020, the first display is wide gamut and the second display is narrow gamut, either the P3 or the 2020 may be limited and/or clipped and mapped to the second display. In some examples, a portion that is clipped may be highlighted, so a user is aware. A prompt, in some examples, may be displayed indicating clipping and/or limiting. In some instance, a prompt may be given suggesting switching displays to move a wider color gamut assignment to an available wider color gamut display.

Figure 3:
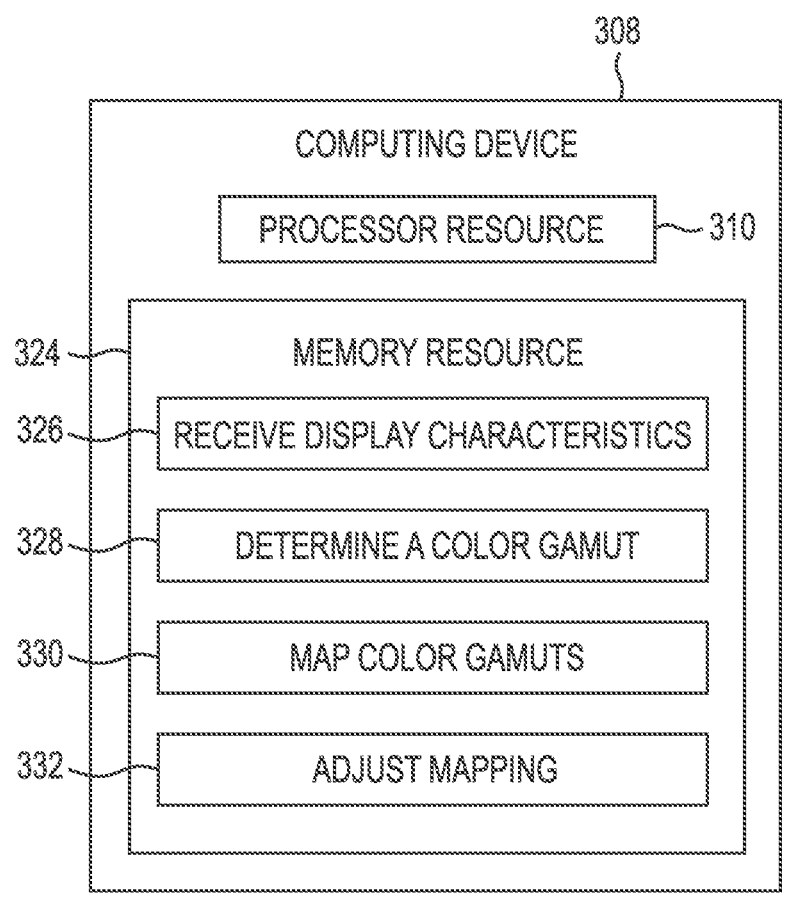
FIG. 3 illustrates another example of a computing device for color gamut mapping.

FIG. 3 illustrates another example of a computing device 308 for color gamut mapping. In some examples, the processor resource 310 and the memory resource 324 may be analogous to the processor resource 210 and memory resource 212, respectively, as described with respect to FIG. 2. The computing device 308 (hereinafter referred to as the "host computing device") may be analogous to the computing devices 108, 208 described with respect to FIGS. 1 and 2, respectively.

Instructions 326, when executed by a processor such as the processor resource 310, may cause the computing device 308 to receive display characteristics of each one of a plurality of displays communicatively coupled to the host computing device 308. The display characteristics, for instance, can include a color gamut specification and an associated EOTF. The display characteristics of each one of the plurality of displays may be the same as other displays or different. For instance, some of the plurality of displays may be wide gamut, while others are narrow gamut. Display EOTFs may vary, as well, in some examples.

Instructions 328, when executed by a processor such as the processor resource 310, may cause the host computing device 308 to determine a color gamut assigned to each one of a plurality of virtual machines executing on the host computing device 308 and communicatively coupled to the plurality of displays. For instance, each virtual machine may be assigned a particular color gamut, and in some examples, a change of color gamut assignment to a virtual machine of the plurality of virtual machines may be prohibited.

Instructions 330, when executed by a processor such as the processor resource 310, may cause the host computing device 308 to map each one of the determined color gamuts to one of the plurality of displays based on the display characteristics and the assigned color gamuts. For instance, the color gamuts can be mapped to a display that can most accurately display the assigned color.

Instructions 332, when executed by a processor such as the processor resource 310, may cause the host computing device 308 to adjust the mapping in response to removal of a virtual machine, additional of a virtual machine, removal of a display, addition of a display, or any combination thereof. For instance, if a virtual machine is removed, a different assigned color gamut can be mapped to the display previously displaying an image associated with the removed virtual machine. Similar, if a display is removed, a color gamut previously mapped to that removed display may be mapped to a different, available display, or may share a display with another virtual machine. In some examples, a first display, for instance of a narrower gamut, may receive a mapping of a less colorful image such as a word processing document (e.g., even if the associated virtual machine is assigned a wide color gamut), so a colorful image may be displayed on a wider gamut display.

In some instances, the memory resource 324 can include instructions executable to limit an image, clip an image, or both, in response to the image being displayed on a display of the plurality of displays having a lower color gamut specification than the assigned color gamut of an associated virtual machine of the plurality of virtual machines. For instance, if a wide gamut display is not available for a virtual machine assigned a wider color gamut, it can be mapped to the narrower gamut display while still accurately displaying an image (e.g., picture, video, document, etc.). In some instances, a portion of the image clipped in response to the image having a lower color gamut specification than the assigned color gamut of an associated virtual machine of the plurality of virtual machines can be indicated via a display of the plurality of displays. For instance, the portion may be highlighted and/or a prompt displayed for the user's awareness.

In some examples, the memory resource 324 can include instructions to provide a prompt via a first display of the plurality of displays to move an image to a second display of the plurality of displays based on the display characteristics of the first and the second display and the assigned color gamut of the virtual machine associated with the image. For instance, a first display having a narrower gamut may be displaying a wide color gamut image, while a second display having a wider gamut may be displaying a less colorful image such as a word processing document (e.g., even if the associated virtual machine is assigned a wide color gamut). In such an example, a user may be prompted to switch screens to display the more colorful image on the wider gamut display and the less colorful image on the narrower gamut display.

Figure 4:
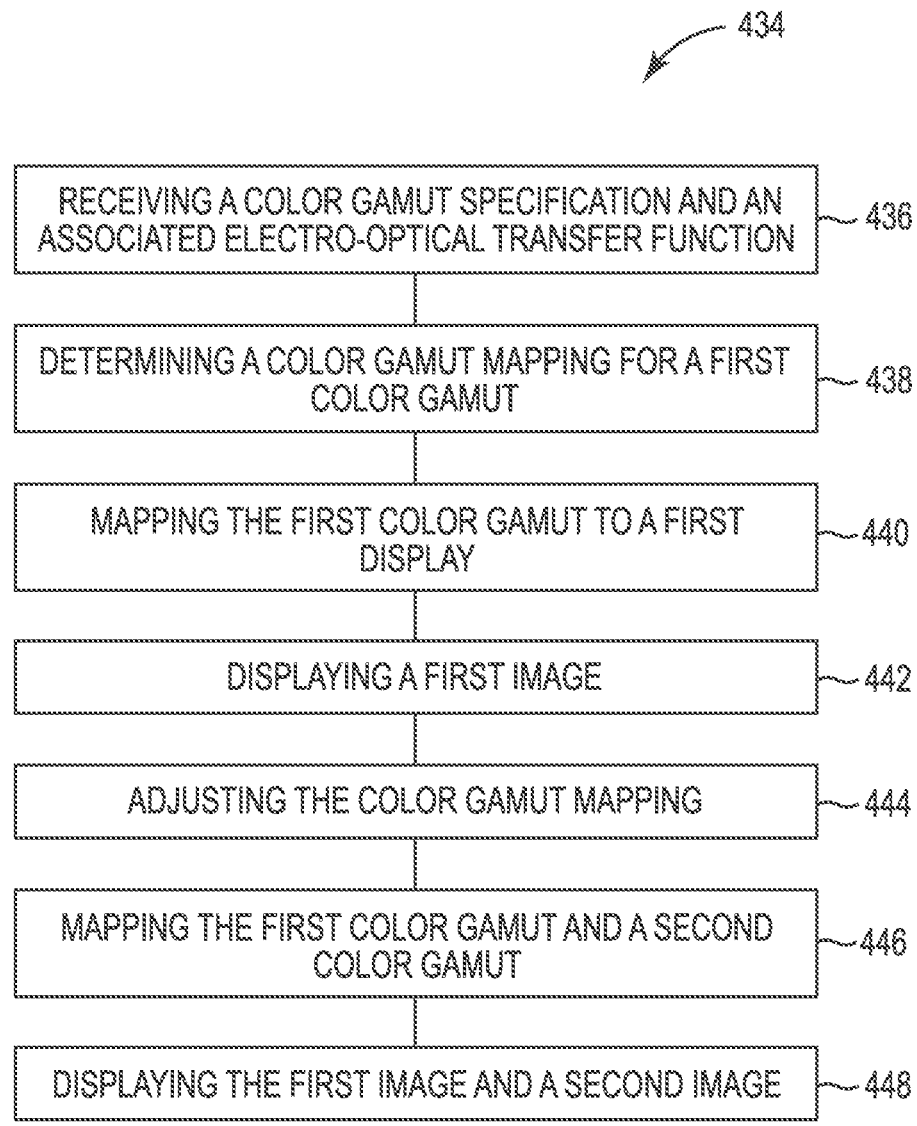
FIG. 4 illustrates an example of a method for color gamut mapping.

FIG. 4 illustrates an example of a method 434 for color gamut mapping. The method 434 can be performed by a computing device such as the computing devices 208, 308 described with respect to FIGS. 2 and 3 and/or a system described with respect to FIG. 1. In some examples, the method 434 may be performed by a local computing device communicatively coupled to a display, a virtual machine, and/or a host computing device executing the virtual machine.

At 436, the method 434 can include receiving, at a processor resource of a host computing device and from a first virtual machine executing on the host computing device and assigned a first color gamut, a color gamut specification and an associated EOTF of a first display communicatively coupled to the host computing device, a color gamut specification and an associated electro-optical transfer function of a second display communicatively coupled to the host computing device, or both. The color gamut specifications and associated EOTFs of the respective displays may be the same or different. In some examples, the first and the second displays are portions of a single display.

At 438, the method 434 can include determining, at the processor resource and based on the first color gamut and the respective color gamut specifications and respective associated electro-optical transfer functions of the first display and the second display, a color gamut mapping for the first color gamut. For instance, a determination can be made whether the first color gamut may display more accurately on the first display or the second display. In some instance, determining the color mapping can include mapping a first image (e.g., photo, video, drawing, document, etc.) associated with the first virtual machine to the first display and a second image associated with the first virtual machine to the second display. For instance, an animation in the first color gamut may be mapped to the first display, and a tool display (e.g., sliders, controls, adjusters, etc.) may be mapped to the second display when the first display has a wider gamut based on the color gamut specifications and EOTFs than the second display.

At 440, the method 434 can include mapping, at the processor resource, the first color gamut to the first display based on the color gamut mapping. For instance, if the mapping indicates a 2020 assigned first color gamut to the first virtual machine, and the first display is wide gamut, the first color gamut can be mapped to the first display. In some instances, the first color gamut can be mapped to both the first and the second display.

The method 434, at 442, can include displaying, via the first display, a first image associated with the first virtual machine. In some examples, the image may be spread over both the first and the second displays. A first image associated with the first virtual machine, in some instances, can be displayed on the first display and a second image associated with the first virtual machine can be displayed on the second display.

At 444, the method 434 can include adjusting, at the processor resource, the color gamut mapping in response to adding a second virtual machine having a second color gamut assignment executing on the host computing device. For instance, if the second virtual machine is executed on the host computing device, the color gamut mapping can be adjusted to consider the second color gamut, which may be the same, narrower, or wider than the first color gamut.

At 446, the method 434 can include mapping, at the processor resource, the first color gamut to the first display or the second display and the second color gamut to a remaining display based on the color gamut mapping. For instance, if the first color gamut is wider than the second color gamut and the first display has a wider color gamut than the second display, the first color gamut can be mapped to the first display, and the second color gamut can be mapped to the second display.

The method 434, at 448, can include displaying, via the first display and the second display, the first image associated with the first virtual machine and a second image associated with the second virtual machine based on the mapping of the first color gamut and the second color gamut. For example, the first image can be displayed via the first display, and the second image can be displayed via the second display. In such an example, the first virtual machine has a higher assigned color gamut as compared to the second virtual machine, and the first display comprises a wider gamut display as compared to the second display, resulting in the first image (associated with the first virtual machine) displayed on the first display.

In some examples, the first image can be limited and clipped in response to loss of communication between the first display and the host computing device. In such an example, the second image can be displayed on a first portion of the second display, and the limited and clipped first image can be displayed on a second portion of the second display.

In some examples, the method 434 can include displaying, via a third display communicatively coupled to the host device, a limited and clipped third image associated with the first virtual machine or the second virtual machine. For instance, a user may wish to display three images across three displays, but the third display may be a narrower gamut display than the desired image's color gamut. In such an example, the third image may be limited and clipped to accurately display the third image.

In the foregoing detailed description, reference is made to the accompanying drawings that form a part hereof, and in which is shown by way of illustration how examples may be practiced. These examples are described in sufficient detail to enable those of ordinary skill in the art to practice the examples described herein, and it is to be understood that other examples may be utilized and that process, electrical, and/or structural changes may be made without departing from the scope of the specification. Further, as used herein, "a" can refer to one such thing or more than one such thing.

The figures herein follow a numbering convention in which the first digit corresponds to the drawing figure number and the remaining digits identify an element or component in the drawing. For example, reference numeral 208 may refer to element "08" in FIG. 2 and an analogous element may be identified by reference numeral 308 in FIG. 3. Analogous elements within a Figure may be referenced with a hyphen and extra numeral or letter. See, for example, elements 106-1, 106-2, . . . , 106-N in FIG. 1. Such analogous elements may be generally referenced without the hyphen and extra numeral or letter. For example, elements 106-1, 106-2, . . . , 106-N may be collectively referenced as 106. Elements shown in the various figures herein can be added, exchanged, and/or eliminated to provide additional examples. In addition, the proportion and the relative scale of the elements provided in the figures are intended to illustrate the examples described herein and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications and use of the system and method. Since many examples can be made without departing from the spirit and scope of the system and method, this specification merely sets forth some of the many possible example configurations and implementations.

What is claimed is:

1. A non-transitory machine-readable medium including instructions that when executed cause a processor resource to:
   receive, from a first virtual machine assigned a first color gamut and executing on a host computing device, display characteristics of a first display communicatively coupled to the host computing device and display characteristics of a second display communicatively coupled to the host computing device;
   receive, from a second virtual machine assigned a second color gamut and executing on the host computing device, the display characteristics of the first display and the display characteristics of the second display, or both;
   determine, based on the first color gamut, the second color gamut, the display characteristics of the first display, and the display characteristics of the second display, a color gamut mapping for the first color gamut and the second color gamut;
   map the first color gamut to the first display based on the color gamut mapping;
   map the second color gamut to the second display based on the color gamut mapping; and
   provide a prompt, via the first display of a plurality of displays to move an image to the second display of the plurality of displays based on the display characteristics of the first and the second display and the first and second color gamuts of the first and second virtual machines associated with the image.

2. The medium of claim 1, wherein the first display is a first portion of a single display, and the second display is a second portion of the single display.

3. The medium of claim 1, wherein the display characteristics comprise a color gamut specification of the display and an electro-optical transfer function (EOTF) associated with the display.

4. The medium of claim 1, wherein the host computing device is a local host computing device.

5. The medium of claim 1, wherein the host computing device comprises a cloud computing service.

6. The medium of claim 1, wherein the host computing device comprises an edge computing device.

7. A non-transitory machine-readable medium including instructions that when executed cause a processor resource to:
receive display characteristics of each one of a plurality of displays communicatively coupled to a host computing device,
wherein the display characteristics comprise a color gamut specification and an associated electro-optical transfer function:
determine a color gamut assigned to each one of a plurality of virtual machines executing on the host computing device and communicatively coupled to the plurality of displays;
map each one of the determined color gamuts to one of the plurality of displays based on the display characteristics and the assigned color gamuts;
adjust the mapping in response to removal of a virtual machine, additional of a virtual machine, removal of a display, addition of a display, or any combination thereof; and
prohibit a change of color gamut assignment to a virtual machine of the plurality of virtual machines.

8. The medium of claim 7, further comprising instructions executable to limit an image, clip an image, or both, in response to the image being displayed on a display of the plurality of displays having a lower color gamut specification than the assigned color gamut of an associated virtual machine of the plurality of virtual machines.

9. The medium of claim 7, further comprising instructions executable to indicate, via a first display of the plurality of displays displaying an image, a portion of the image clipped in response to the image having a lower color gamut specification than the assigned color gamut of an associated virtual machine of the plurality of virtual machines.

10. A method, comprising:
receiving, at a processor resource of a host computing device and from a first virtual machine executing on the host computing device and assigned a first color gamut, a first color gamut specification and an associated electro-optical transfer function of a first display communicatively coupled to the host computing device and a second color gamut specification and an associated electro-optical transfer function of a second display communicatively coupled to the host computing device, or both;
determining, at the processor resource and based on the first color gamut and the respective color gamut specifications and respective associated electro-optical transfer functions of the first display and the second display, a color gamut mapping for the first color gamut;
mapping, at the processor resource, the first color gamut to the first display based on the color gamut mapping;
displaying, via the first display, a first image associated with the first virtual machine;
adjusting, at the processor resource, the color gamut mapping in response to adding a second virtual machine having a second color gamut assignment executing on the host computing device;
mapping, at the processor resource, the first color gamut to the first display or the second display and the second color gamut to a remaining display based on the color gamut mapping; and
displaying, via the first display and the second display, the first image associated with the first virtual machine and a second image associated with the second virtual machine based on the mapping of the first color gamut and the second color gamut.

11. The method of claim 10, further comprising displaying, via a third display communicatively coupled to the host device, a limited and clipped third image associated with the first virtual machine or the second virtual machine.

12. The method of claim 10, further comprising:
displaying the first image via the first display, wherein the first display comprises a wider gamut display as compared to the second display; and
displaying the second image via the second display,
wherein the first virtual machine has a higher assigned color gamut as compared to the second virtual machine.

13. The method of claim 12, further comprising:
limiting and clipping the first image in response to loss of communication between the first display and the host computing device;
displaying the second image on a first portion of the second display; and
displaying the limited and clipped first image on a second portion of the second display.

* * * * *